United States Patent [19]

Klenk

[11] Patent Number: 5,368,151
[45] Date of Patent: Nov. 29, 1994

[54] CONVEYOR SYSTEM FOR CONTAINERS

[75] Inventor: Klaus Klenk, Worms, Germany

[73] Assignee: Krones AG Hermann Kronseder Maschinenfabrik, Neutraubling, Germany

[21] Appl. No.: 147,729

[22] Filed: Nov. 2, 1993

[30] Foreign Application Priority Data

Nov. 7, 1992 [DE] Germany .............. 9215186[U]

[51] Int. Cl.⁵ .............................. B65G 47/26
[52] U.S. Cl. .................. 198/426; 198/726; 198/612; 198/613; 198/836.1
[58] Field of Search ............ 198/418, 418.7, 426, 198/480.1, 481.1, 608, 612, 613, 620, 836.1, 726, 727

[56] References Cited

U.S. PATENT DOCUMENTS

| | | | |
|---|---|---|---|
| 2,699,278 | 1/1955 | Wysolki | 198/612 X |
| 3,369,644 | 2/1968 | Niederer | 198/426 X |
| 3,523,604 | 8/1970 | Babunovic et al. | 198/612 X |
| 5,143,204 | 9/1992 | Owen et al. | 198/726 |

Primary Examiner—James R. Bidwell
Attorney, Agent, or Firm—Ryan, Kees & Hohenfeldt

[57] ABSTRACT

Rows of bottles are conveyed on parallel running belts. Closed loop flexible members such as roller chains, run in vertical planes along the longitudinal edges of the belts in the same direction as the belts. The closed loop chains have stabilizing devices mounted to them for stabilizing the bottles in each row as they move along on the belts beyond a bottle infeed region. The stabilizing devices each constitute a pair of fingers that are pivotally mounted to pins that stand up from the closed loop chains and are spring biased so that they diverge at a predetermined angle from each other when they are not restrained from doing so. As the sets of fingers are carried around on the chain, they reach a region where the bottles are deposited on the belts. At least in this region, the fingers of the stabilizing devices arrive between parallel plates which cause the fingers to pivot towards each other in an overlapping relationship so that they are clear from the pathway defined by the belts. After the bottles advance in a row, a small distance from where the fingers are restrained, the fingers emerge from between the plates and the springs cause the fingers to diverge at an angle from each other and establish contact with bottles on the belt to stabilize them. The fingers swing in a horizontal plane so they use none of the head room above the bottles, thereby allowing for a more compact conveyor system.

18 Claims, 2 Drawing Sheets

CONVEYOR SYSTEM FOR CONTAINERS

BACKGROUND OF THE INVENTION

The invention disclosed herein pertains to a conveyor system for conveying containers such as bottles, especially light-weight, unstable plastic bottles, to a bottle treating device such as a washing machine.

A conveyor system for similar purposes is described in German Patent DE-PS 1 183 428. In the patented system, containers are conveyed in rows with each container on an individual belt such that at a certain point in the travel of the containers, they can be picked up or transferred to a washing machine, for example. Closed loop flexible members such as cables or roller chains run parallel to the belts so that there is a chain running on each side of a bottle standing on any one of the belts. Containers, especially plastic bottles, must be supported in a stable manner while the belts are transporting them. In the patented system, the bottles are stabilized by a moving rod that extends over the full width of the path of travel of all container rows. The chain loops which run in the direction of the belts can be set at the desired height of the containers, for instance, at the height of the center of gravity, so that containers, even those with poor stability such as bottles made of plastic can be held upright. A highly disadvantage feature of the existing conveyor system is, however, the requirement for a substantial amount of height above the upwardly and downwardly moveable stabilizer rods.

Besides, in the patented system, the carriers or stabilizers can be folded up only when the containers at the head of the container row are contacted by the grippers of a container handling machine such as container packing machine or washing machine. The length of the conveyor system in the region where the rows are transferred, one by one, must be quite long. The members that move to guide the stabilizer rods down can change the position of the containers on the belts and disturb the container movement.

In another system described in German laid open patent DE-OS 37 02 954 several continuous drawing means or chain loops run in parallel vertical planes located completely under the path of travel of several container rows. Attached to the drawing means or chains are stabilizing members which have the shape of cams. The cams are in the plane of travel and at a right angle relative to the direction of travel. The cams rise up slightly between conveyor belts that transport the containers and contact the containers at their lower ends. This system has the merit of being compact, but it is only appropriate for containers which are more massive and, hence, more stable than light-weight plastic bottles.

SUMMARY OF THE INVENTION

An objective of the new conveyor system disclosed herein is to reduce the space required for the conveyor system and assure that containers of all shapes will be transported in a stable orderly manner. The new conveyor system has a plurality of conveyor belts running parallel with closed loop flexible members such as cables or roller chains running in vertical planes between belts and laterally of or adjacent the longitudinally extending edges of the container conveying belts. Elongated stabilizer members are mounted on the chains in rows corresponding with the distance between rows desired for the containers. The stabilizer members are mounted for pivoting about an axis, that is perpendicular to the plane of the belts, and they can swing into each container from opposite sides to get behind the containers and enhance their stability. The stabilizer members are comprised preferably of two fingers which are spring biased to urge the fingers to diverge and create an angle between them where they swing out from the flexible members and into active position for engaging and supporting the containers on the belts. At places along the conveyor system where it would be undesirable for the fingers to extend over the conveyor belts, they are passed between guide plates which fold the fingers toward each other and let them assume a resting or parking position completely over the stabilizer carrying flexible loops such as the chains. Because the fingers swing in a horizontal plane above a vertical axis and because one finger from the stabilizer member extends over one conveyor belt and the other finger extends over an adjacent conveyor belt to make contact with a container, practically no overhead room is required, other than the height of the containers themselves to achieve the stabilizing function. Because the fingers can be relatively short, since they only need to cover part of the width of an adjacent belt, and because they swing horizontally into contact with the bottles, there is no disadvantageous change in the position of the containers. Since the height requirements for the new conveyor system are minimal, the system can be easily installed where there is little available space as in a bottle packing machine or a bottle washing machine. It should also be noted that, as a result of swinging the stabilizer member fingers in a horizontal plane, as compared with coming down in a vertical direction toward the containers as in the prior art, containers of various configurations can be allowed.

How the foregoing objectives and features and other more specific objectives of the invention are achieved will be evident in the ensuing more detailed description of a preferred embodiment of the invention which will in now be set forth reference to the drawings.

DESCRIPTION OF A PREFERRED EMBODIMENT

Figure 1:
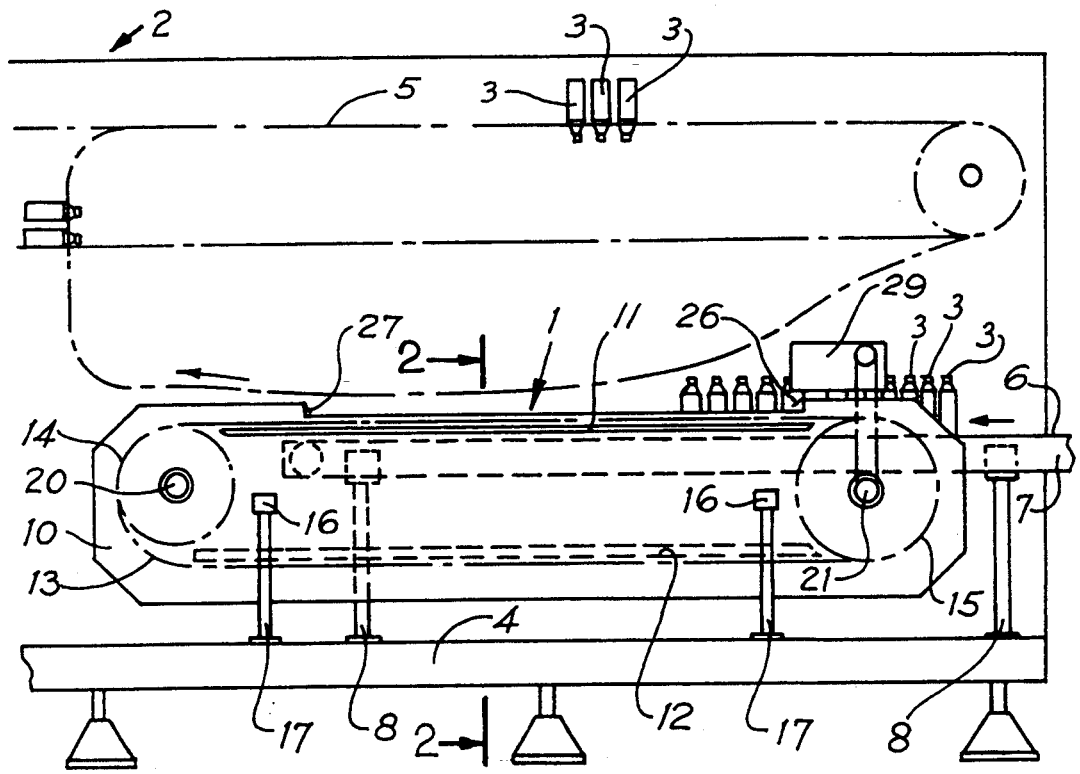
FIG. 1 is a diagrammatic side-elevational view of the new conveyor system installed under the conveyor of a bottle washing machine.

The new conveyor system in FIG. 1 is designated generally by the numeral 1 and is depicted, for illustrative purposes, in conjunction with a partially and diagrammatically portrayed bottle washer which is generally designated by the numeral 2. It is assumed that the bottle washer is adapted for washing bottles 3 made of man made materials such as plastic. The bottle washer 2 includes a frame 4 and a conveyor 5 which is illustrated with phantom lines. Conveyor 5 is assumed to have facilities for grasping bottles by their heads in groups of at least three and transports the bottles continuously in the washer until they are discharged. A suitable conveyor is described in greater detail in German registered design No. 91 10 492. For the conveyor 5 to receive bottles in groups of three accurately and properly, the bottles must be conveyed to conveyor 5 in parallel rows, such as rows of three bottles in the disclosed embodiment, at proper spacing between the rows. The conveyor system 1 assures that this will occur.

Conveyor system 1 has three horizontal conveyor belts 6a, 6b and 6c with supports 7, which are supported on frame 4 by means of several supports 8. Conveyor belts 6a, 6b and 6c are driven continuously and synchronously with conveyor 5 of the washing machine 2 and both conveyors are at the same translational speed. The widths of the belts correspond closely with the diameter of the bottles 3. A bottle of each belt makes up a row of bottles, and the rows are spaced at definite distances from each other.

Figure 2:
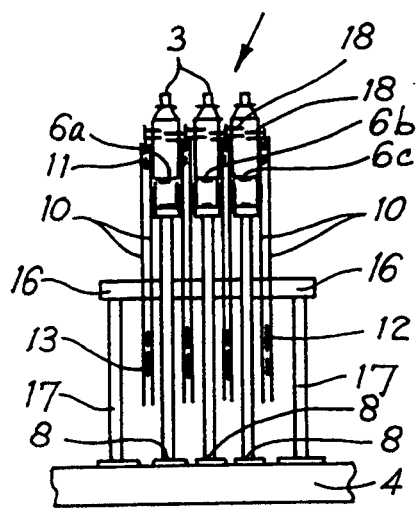
FIG. 2 is a vertical section taken on a line corresponding with 2—2 in FIG. 1.

There is some space between the adjacent and parallel coplanar conveyor belts. The spaces between belts 6a and 6b and between 6b and 6c are indicated by the numeral 9. The spaces, of course, extend in the longitudinal direction of the belts. As one may see in FIG. 2 and particularly well in FIG. 3, the middle belt 6b of the three belts has the spaces 9 on each side of it, and they are occupied by stabilizer closed loop flexible members such as carrier chains 13 which, as indicated by the unmarked arrows, all run in the same direction. The upper and lower runs of the flexible members or chains 13 are both coincident with the same vertical plane. As can be seen particularly well in FIG. 3 at a place where the bottles 3 may enter onto belt 6b, there are adjacent pairs of vertically extending parallel plates 10 which render inoperative pivotable container stabilizing devices 18 which will be described soon. For a short distance, the chains 13 translate or run between these plate pairs 10. As shown in FIG. 2, there are also pairs of parallel plates 10 on the lateral outside longitudinally extending edges of the conveyor belts, that is, laterally of the edges of belt 6c and of the outside edge of belt 6a so there are actually four sets of the parallel plates 10 which have stabilizer member carrier chains 13 running between them for some distance. The distance between the four pairs of plates 10 is a little greater than the diameter of the bottles 3 so the plates also serve as lateral guidance for the bottles. The plates 10, extend upwardly above the planes or surfaces of the upper runs of conveyor belts 6 and downwardly beyond the lower runs of conveyor belts 6.

Attached at the upper and lower horizontal longitudinal sides of each pair of plates 10 there is a contoured guide rail 11, 12 for supporting continuous flexible meter 13 loops, which may be roller chains 13, which constitutes the stabilizer device 18 carrying flexible member. The four chains 13 run in vertical planes and run over a drive sprocket 14 and an idler sprocket 15. Both sprockets are located between the plates 10 in a pair and are attached to common shafts 20 and 21, respectively. The chain supports 11 and chains 13 may be seen in section in FIG. 5 and 6 where they appear between pairs of plates 10. The four pairs of plates 10 are mounted on several horizontally extending structural members 16 which are supported on upstanding columns 17. The columns are standing on the frame member 4 of the bottle washer 2.

As shown in FIG. 1, the upper guide rails 11 are positioned at the height of the body of the bottles 3 while the lower guide rails 12 lie fully under conveyor belts 6.

Figure 3:
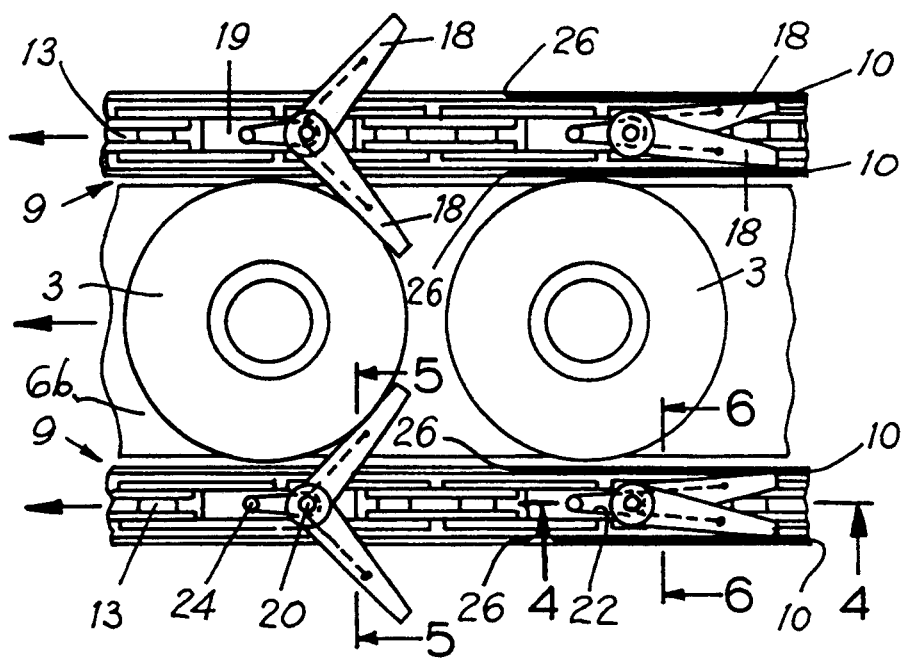
FIG. 3 is a magnified plan view of one conveyor belt running parallel to stabilizer member carrying chains adjacent each outside edge of a belt.
Figure 4:
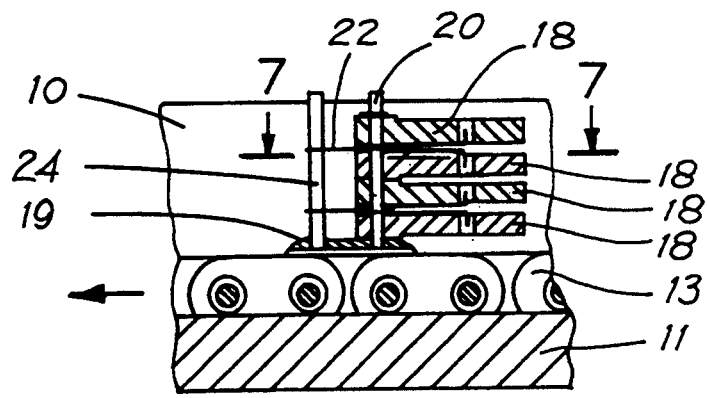
FIG. 4 is a vertical section of a stabilizer finger stack taken in the direction of the arrows 4—4 in FIG. 3.
Figure 5:
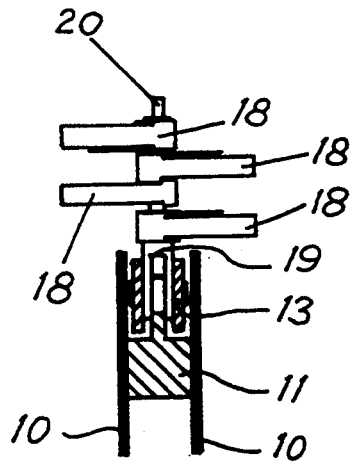
FIG. 5 is vertical section looking in the direction of the arrows 5—5 in FIG. 3.
Figure 6:
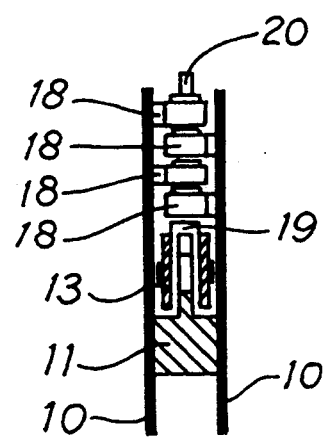
FIG. 6 is a vertical section looking in the direction of the arrows 6—6 in FIG. 3; and, FIG. 7 is an enlarged fragmentary view of one of the stabilizer finger pairs looking in the direction of the arrows 7—7 in FIG. 4.

As shown in FIGS. 3–7 in detail, the stabilizer device 18, carrier chains 13, which are indicated only by their center lines in FIGS. 1 and 2 are guided by the guide rails 11 and 12 and to some extent where necessary by plates 10. The containers, represented as bottles 3 are stabilized on the conveyor belts 6 by stabilizer members 18 which are mounted to the chains 13. For this purpose, the chains 13 are provided at longitudinally equally spaced apart places with mounting links 19 which can be seen particularly well in FIG. 4. This FIGURE also illustrates the upstanding rod 20 on which the fingers of the stabilizer devices 18 are pivotally mounted. The fingers are spring biased so they diverge from each other for the purpose of making contact with the periphery of the bottles 3 for stabilizing the bottles as shown in respect to the leading bottle 3 to the left in FIG. 3. Rods 20 are upstanding or vertical in the vertical plane of transport of the chains 13 when the rods are in the upper horizontal run of the chains. The stabilizer devices 18 are also pivotable in the region of travel outside of the sprockets 14 and 15 in planes in which the closed loop chains 13 travel. There are several stabilizer devices 18 on each of the rods 20 as depicted in FIGS. 4–6. Actually, the rods 20 that are mounted on the outside edges of the chains adjacent or laterally of the outside belts 6 have only two stabilizer members mounted on them while the rods 20 on the interior chains 13 carrying four stabilizer devices 18. As is evident in FIG. 3, one of the two fingers comprising a stabilizer device 18 will extend over one of the belts, such as 6b and the other finger will extend over an adjacent belt which, in this case, would be over belts 6a and 6b, respectively. So, in any case, there will be a total of four fingers engaged with a periphery of a bottle where the fingers come in from opposite directions and form a V-shaped configuration and are tangent to the periphery of the bottles. Also, as shown in FIG. 3, the length of each stabilizer 18 finger is no greater than half the diameter of the bottle so there is no interference between pairs of the stabilizers that are positioned exactly opposite each other when they reach into the path of bottle travel. The stabilizers 18 form an acute angle with the supporting chains 13 when they are in active position as demonstrated by the left most pair of stabilizer devices 18 in FIG. 3. Thus, when the stabilizer fingers are in their active or operative position, they apply forces to a bottle which tends to center the bottle on the belt. An advantage of this is that the stabilizer fingers can function effectively to stabilize bottles having various diameters and, particularly, diameters even substantially less than the width of the belts 6.

In FIG. 3, the two sets of stabilizer devices 18 to the right are shown to have their fingers collapsed towards each other or nondiverging because of being between restraining plates 10. As the chain 13 moves to the left, however, it will be evident that the fingers of the stabilizer devices 18 can diverge and spring apart until they are stopped at a predetermined angle between each other.

Figure 7:
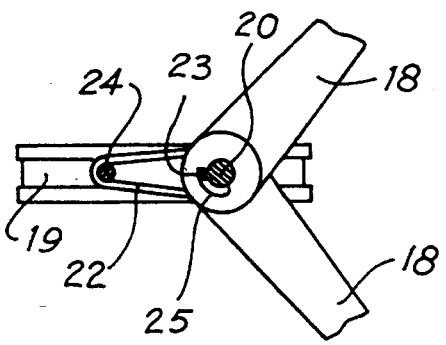

Attention is now invited to FIGS. 3, 4 and 7 for a more detailed discussion of the structure and function of the stabilizer devices 18. As shown particularly well in FIG. 4, the force for biasing the fingers of devices 18 at an angle relative to each other is derived from springs 22 which spiral around rod 20 to form a torsion spring having straight portions that extend radially outwardly from rod 20 and terminate in right angularly bent ends that register in holes in the fingers above and below each other to effect a biasing force on the fingers that tends to cause the fingers to diverge at a limited angle relative to each other. Each spring is a continuous wire member, which not only winds around rod 20 to form a torsion spring, but also has one loop formed with an opening which fits over a rod 24 that constitutes an anchor for the springs. The free ends of the springs 22 force the pair of fingers of any one stabilizer device 18 in opposite directions for one finger to extend over one belt and the other finger to extend over an adjacent belt. The angular amount by which the fingers of the stabilizer devices 18 are able to diverge from each other is governed by the lug 23 on pin 20 as shown in FIG. 7. Lug 23 extends radially from pin 20 into an arcuate slot 25 in the fingers in a pair so the ends of the slot 25 constitutes stops for preventing the fingers from diverging further. When the fingers are in the operating or active position as they are in the left portion of FIG. 3 and in FIG. 5, the spring action is stopped by the lug.

FIGS. 3 and 6 show the fingers of one of the stabilizer devices 18 in their restrained or inactive position where they are prohibited from diverging under the influence of the springs as a result of being restrained between parallel side plates 10. When the fingers of the stabilizing devices 18 are folded towards each other as they are in the right portion of FIG. 3 and in FIG. 6, they are incapable of exerting any stabilizing force on the three bottles that are still in the infeed section of the conveyor belts 6 which is adjacent the vertical edge or shoulders 2 of the side plates 10. At this point, there is still some stability imparted to the bottles by the side plates 10. As the bottles progress to the left on the conveyor belts 6, the fingers of the stabilizing device 18 are carried along with the chain 13 and emerge from the space between the plates 10. This removal of restraint on the fingers allows the fingers to diverge under the influence of the springs 22 as the fingers are exhibited in the left half of FIG. 3. Of course, the stabilizers 18 in the spaces 9 between the belts 6, all become operative at the same time so as to maintain bottles on the adjacent conveyor belts 6a, 6b and 6c in a straight line or row. Note, in FIG. 1 that plates 10 are cut away over a distance extending from shoulder 26 to shoulder 27. Thus, in those areas where the fingers must occupy their operating position, they can do so since they have clearance over the top edges of the side plates 10, whereas in areas in which the fingers must be stored or restrained against diverging, the plates are not cut away as they are between shoulders 26 and 27, so that the fingers are retained between plates 10 in opposition to the force of springs 22. As soon as the ends of the fingers have passed the shoulder or control edge 26, the fingers snap into their operating position under the influence of biasing springs 22. By having a finger from stabilizer devices 18 from two different chains 13 swinging in to bear on the periphery of bottles 3, the fingers can be made quite short. This is so because extremely good stability is induced by having fingers from opposite directions in a V-shaped configuration to provide what is in the nature of a pocket for stabilizing a bottle. After passing control edge or shoulder 27 on side plates 10, the control edge has already started the fingers to pivot towards each other and assume the position in which they are depicted in FIG. 6 between plates 10 which prohibit them from swinging outwardly until the chain makes a complete circuit and the fingers pass control edge 26 again.

The first control edge 26 is positioned at the infeed region of conveyor system 1 just before the place where the bottles 3 are arranged in rows by a machine 29 on the three conveyor belts 6a–c. In this region, the rows of bottles 3 that are now on conveyor belts 6 are synchronized with the bottle washing conveyor 5 and are established at the desired distance from each other. The machine 29 is a known type of separating apparatus 29 which may be of the type described in German patent DE-PS 1 183 428 or of the type described in German application DE-OS 37 02 954.

The second control edge or shoulder, 27 is positioned in the discharge region of the conveyor 1 system shortly before the chain 13 runs around the drive sprocket 14. In this region, conveyor 5 extends onto the top of the bottles on conveyor belts 6 and grips them fully. Subsequently, with the stabilizer members 18 retracted between plates 10, the bottles 3 are lifted from belt conveyor system 1 by gripping devices, not shown, on conveyor 5 after which the bottles are transported through the bottle washing machine 2.

The plates 10 are only shown in outline in FIG. 1, but they need not be imperforate plates since they can be cut out in certain areas because they perform no function in the central area between the sprockets 14 and 15 or the guide rails 11 and 12.

It can be desirable for obtaining greater containers stabilizing results to stack a plurality spring biased finger pair of stabilizer devices 18 on rod 20.

It will be evident from inspection of FIG. 2 that chain 13 laterally to the left edge of leftmost belt 6a and chain 13 laterally to the right edge of rightmost belt 6c require stabilizer devices 18 which have only one spring biased finger. The reason is that a finger on the leftmost chain 13 only has to swing over about one-half the width of belt 6a to cooperate with a finger on the chain between belts 6a and 6b to stabilize a bottle together, and a finger on rightmost chain 13 only has to swing over about one-half the width of belt 6c to cooperate with a finger from the chain 13 between belts 6b and 6c to stabilize a bottle.

I claim:

1. A conveyor system adapted for stable conveyance of rows of containers conveyed thereon, comprising:
   a plurality of closed loop conveyor belts having upper and lower runs arranged for translating in parallel with each other with the upper runs in the same horizontal plane and having spaces adjacent their longitudinally extending edges, a predetermined region of said upper runs of the belts constituting a container infeed region,
   closed loop flexible members positioned for running in the spaces adjacent the respective longitudinally extending edges of the belts in synchronism with the belts,
   a series of mounting elements mounted in uniform spaced apart relationship to said closed loop flexible members to form aligned rows of elements disposed along lines that are perpendicular to the translational direction of the belts and the closed loop flexible members, said closed loop flexible members positioned laterally adjacent said belts and between longitudinally extending edges of the belts having at least one pair of container stabilizing members mounted to said mounting elements for pivoting about an axis that is vertical when translating along said horizontal run of the belts, biasing means for biasing said container stabilizing members to diverge at an angle relative to each other, restraining means operative to restrain said container stabilizing members against diverging from each other at least until entering said container infeed region and then relieving the restraint for said container stabilizing members to pivot and diverge in a horizontal plane about said vertical axis to an operative position wherein one of a pair of said members is over one belt and the other of the pair of said members is over an adjacent belt for engaging and stabilizing containers on the belts that have been deposited thereon at the infeed region.

2. A conveyor system according to claim 1 wherein said mounting elements on said flexible loop members have one of the elongated container stabilizing members from a pair omitted, biasing means for biasing the remaining elongated container stabilizing members to pivot in a horizontal plane about an axis that is vertical when the mounting element on which the container stabilizing member is mounted is on the upper horizontal run of the flexible loop members.

3. A conveyor system according to claim 1 wherein said closed loop flexible members are roller chains.

4. A conveyor system according to claim 2 wherein said closed loop flexible members are roller chains.

5. A conveyor system according to claim 1 wherein said elongated container stabilizing members have the configuration of fingers.

6. A conveyor system according to claim 2 wherein said elongated container stabilizing members have the configuration of fingers.

7. A conveyor system according to any one of claims 1, 2, 3, 4, 5, or 6 wherein rods are mounted to said mounting elements on the closed loop flexible members and said container stabilizing members are pivotally mounted to said rods, respectively.

8. A conveyor system according to claim 7 wherein said container stabilizing members have the configuration of fingers.

9. A conveyor system according to claim 8 wherein a lug extends radially from a rod and said container stabilizing members have an arcuate slot concentric to said rods into which said lug extends for limiting the angle through which a container stabilizing member can pivot on a closed loop flexible member under the influence of said biasing means.

10. A conveyor system according to any one of claims 1 or 2 wherein said restraining means are members arranged adjacent each other with a space between them and said closed loop flexible member moves between said members for restraining said container stabilizing members in opposition to said biasing means against pivoting in a horizontal plane about a vertical axis over a belt until said closed loop flexible member translates out of said space to remove the restraints for said stabilizing members to engage and stabilize bottles on the conveyor belts.

11. A conveyor system according to claim 10 wherein said members for restraining said container stabilizing member are spaced apart plates.

12. A conveyor according to claim 1 wherein said restraining means comprise spaced apart plates between which said flexible loop members, respectively, translate, said plates having a region of a first height sufficiently above said flexible loop members immediately before said container stabilizing members translate to said container infeed region of the conveyor belts for the plates to restrain said container stabilizing members against pivoting under the influence of the biasing means over a belt, the height of said plates being reduced in a region to a second lower height along said container infeed region and thereafter in the direction of flexible member translation to allow said container stabilizing members to pivot over the belts when the container stabilizing members emerge from between said first height of the plates and move between the plates into said second region of lower height of the plates.

13. A conveyor system according to claim 12 wherein said plates between which the respective closed loop flexible members translate are close enough to the conveyor belts to serve as guides for containers on the belts.

14. A conveyor system according to any one of claims 1, 2 or 12 wherein said closed loop flexible members are roller chains.

15. A conveyor system according to claim 14 wherein said mounting means are specialized links in said roller chain loops, and pins projecting from said specialized links, the axis of the pins being directed vertically when the pins are on the horizontal runs of the chains, the container stabilizing members are mounted for pivoting about vertical axes in horizontal planes when on said horizontal runs of the chains.

16. A conveyor system according to claim 15 including anchoring rods projecting from said specialized links in the chain parallel with the pins projecting from the respective specialized links, said biasing means comprising torsion springs having turns concentric to said pins and at least one turn formed in a loop between which said rod extends to prevent the spring from rotating said torsion springs having free ends engaged with said container stabilizing members.

17. A conveyor system according to claim 15 wherein said container stabilizing members have the configuration of fingers.

18. A conveyor system according to claim 16 wherein said container stabilizing members have the configuration of fingers.

* * * * *